US011244374B2

(12) United States Patent
Faupel et al.

(10) Patent No.: US 11,244,374 B2
(45) Date of Patent: Feb. 8, 2022

(54) SYSTEM AND MACHINE IMPLEMENTED METHOD FOR ADAPTIVE COLLABORATIVE MATCHING

(71) Applicant: REALM IP, LLC, Jackson, WY (US)

(72) Inventors: Julie L. Faupel, Jackson, WY (US);
Hunter Albright, Boulder, CO (US);
Edward Dombrower, Boulder, CO (US)

(73) Assignee: REALM IP, LLC, Jackson, WY (US)

( * ) Notice: Subject to any disclaimer, the term of this patent is extended or adjusted under 35 U.S.C. 154(b) by 103 days.

(21) Appl. No.: 16/701,485

(22) Filed: Dec. 3, 2019

(65) Prior Publication Data

US 2020/0104300 A1 Apr. 2, 2020

Related U.S. Application Data

(63) Continuation-in-part of application No. 16/555,168, filed on Aug. 29, 2019, now Pat. No. 10,621,649.
(Continued)

(51) Int. Cl.
*G06Q 30/00* (2012.01)
*G06Q 30/06* (2012.01)
(Continued)

(52) U.S. Cl.
CPC ... *G06Q 30/0631* (2013.01); *G06F 16/24522* (2019.01); *G06F 16/258* (2019.01);
(Continued)

(58) Field of Classification Search
CPC ........... G06Q 30/0631; G06Q 30/0201; G06Q 30/0617; G06Q 30/0625; G06F 16/24522;
(Continued)

(56) References Cited

U.S. PATENT DOCUMENTS 6,735,568 B1 5/2004 Buckwalter
6,873,996 B2 3/2005 Chand
(Continued)

FOREIGN PATENT DOCUMENTS

WO 2009/065029 A1 5/2009

OTHER PUBLICATIONS

Rental Roost expands lifestyle-based home searches to entire U.S.: Site allows parents to search properties by school district and students to search by proximity to campus. (Dec. 4, 2013). PR Newswire Retrieved from https://search.proquest.com/docview/1464687944?accountid=14753 (Year: 2013).*
(Continued)

*Primary Examiner* — Brittney N Miller
*Assistant Examiner* — Arielle E Weiner
(74) *Attorney, Agent, or Firm* — Martensen IP; Michael C. Martensen

(57) ABSTRACT

An adaptive collaborative platform applies various machine learning techniques to correlate potential purchasers with high-value articles of property that may be of interest. Attributes, characteristics, preferences, and the like of a potential purchaser are scored against attributes and features of articles. The platform learns from interaction by the agents and the potential purchasers and adapts to become more attuned to the desires and lifestyle of purchasers and to gain more and more pertinent information from the listing agents regarding high-value articles, so as to ultimately to arrive at a better match between a high value article for sale and a likely purchaser.

17 Claims, 11 Drawing Sheets

Related U.S. Application Data

(60) Provisional application No. 62/774,769, filed on Dec. 3, 2018, provisional application No. 62/725,947, filed on Aug. 31, 2018.

(51) Int. Cl.
| | |
|---|---|
| *G06F 16/2452* | (2019.01) |
| *G06F 16/25* | (2019.01) |
| *G06F 16/28* | (2019.01) |
| *G06F 16/9536* | (2019.01) |
| *G06K 9/62* | (2006.01) |
| *G06Q 30/02* | (2012.01) |

(52) U.S. Cl.
CPC ........ *G06F 16/288* (2019.01); *G06F 16/9536* (2019.01); *G06K 9/6215* (2013.01); *G06K 9/6264* (2013.01); *G06Q 30/0201* (2013.01); *G06Q 30/0617* (2013.01); *G06Q 30/0625* (2013.01)

(58) Field of Classification Search
CPC .. G06F 16/258; G06F 16/288; G06F 16/9536; G06K 9/6264
USPC ........................................................ 705/26.7
See application file for complete search history.

(56) References Cited

U.S. PATENT DOCUMENTS

| | | | |
|---|---|---|---|
| 8,566,327 B2 | 10/2013 | Carrico | |
| 8,782,038 B2 | 7/2014 | Mishra | |
| 9,824,123 B2 | 11/2017 | Ochandio | |
| 2008/0235005 A1* | 9/2008 | Golan | G06Q 10/10 704/9 |
| 2012/0137367 A1* | 5/2012 | Dupont | G06F 21/00 726/25 |
| 2013/0246120 A1* | 9/2013 | Chang | G06Q 30/0255 705/7.29 |
| 2014/0156581 A1* | 6/2014 | Jayaraman | G06N 5/02 706/46 |
| 2016/0092959 A1* | 3/2016 | Gross | G06Q 30/0276 705/26.62 |
| 2017/0358043 A1 | 12/2017 | Joynt et al. | |
| 2018/0246774 A1 | 8/2018 | Byrne | |
| 2018/0293581 A1* | 10/2018 | Bansal | G06Q 20/4016 |

OTHER PUBLICATIONS

Gifford, C. M. (2009). Collective machine learning: Team learning and classification in multi-agent systems (Order No. 3380463). Available from ProQuest Dissertations & Theses Global. (304916514). (Year: 2009).*

Reference V Continued: Retrieved from https://www.proquest.com/dissertations-theses/collective-machine-learning-team-classification/docview/304916514/se-2?accountid=14753 (Year: 2009).*

PCT/US2019/048957; International Preliminary Report on Patentability; The International Bureau of WIPO; dated Mar. 11, 2021.

Drucker, Steven M. et al., "Helping Users Sort Faster with Adaptive Machine Learning Recommendations", Sep. 5, 2011, International Conference on Financial Cryptography and Data Security; Lecture Notes in Computer Science; Springer, Berlin, Heidelberg; pp. 187-203.

PCT International Application No. PCT/US2019/064150; International Search Report and Written Opinion of the International Searching Authority; International Filing Date Dec. 3, 2019; Applicant Realm IP, LLC; dated Jan. 22, 2020.

Realm IP, LLC; "International Search Report and Written Opinion of the International Searching Authority"; PCT International Application No. PCT/US2019/048957; dated Oct. 24, 2019.

* cited by examiner

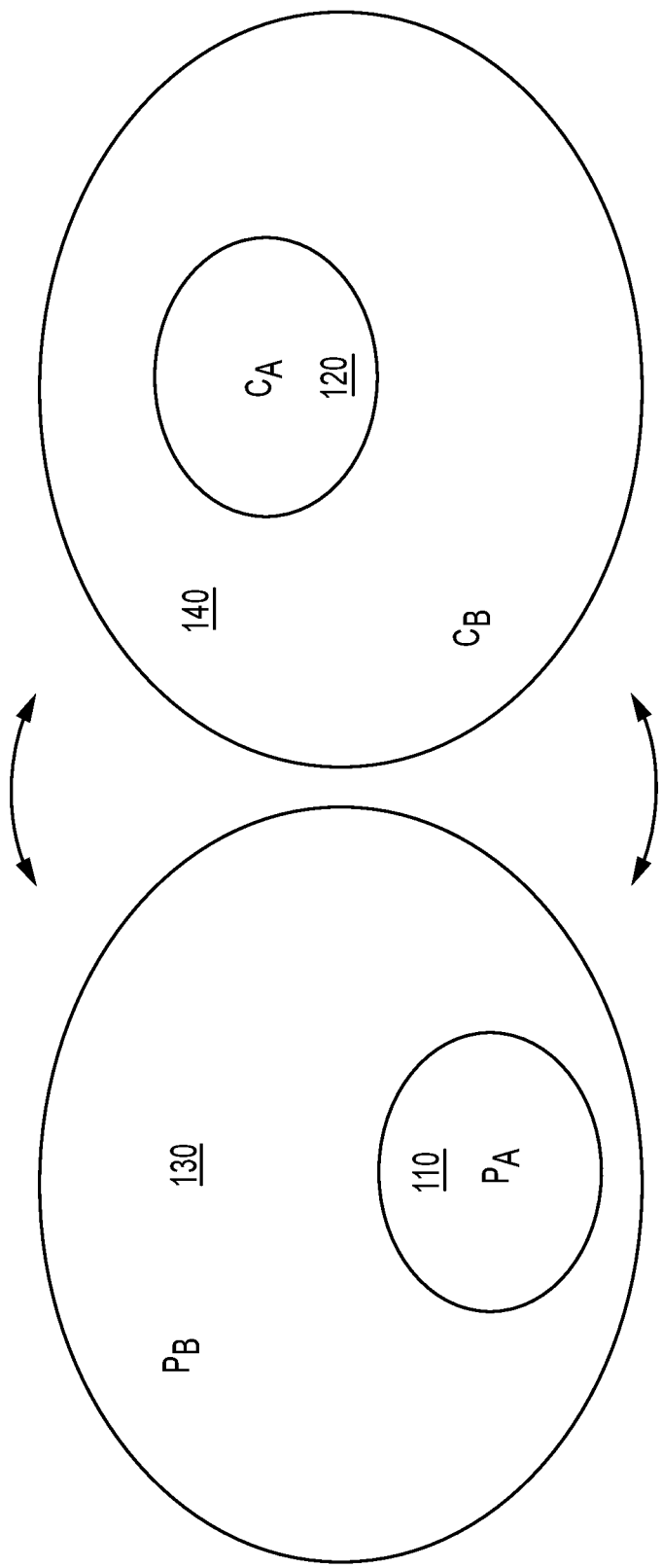

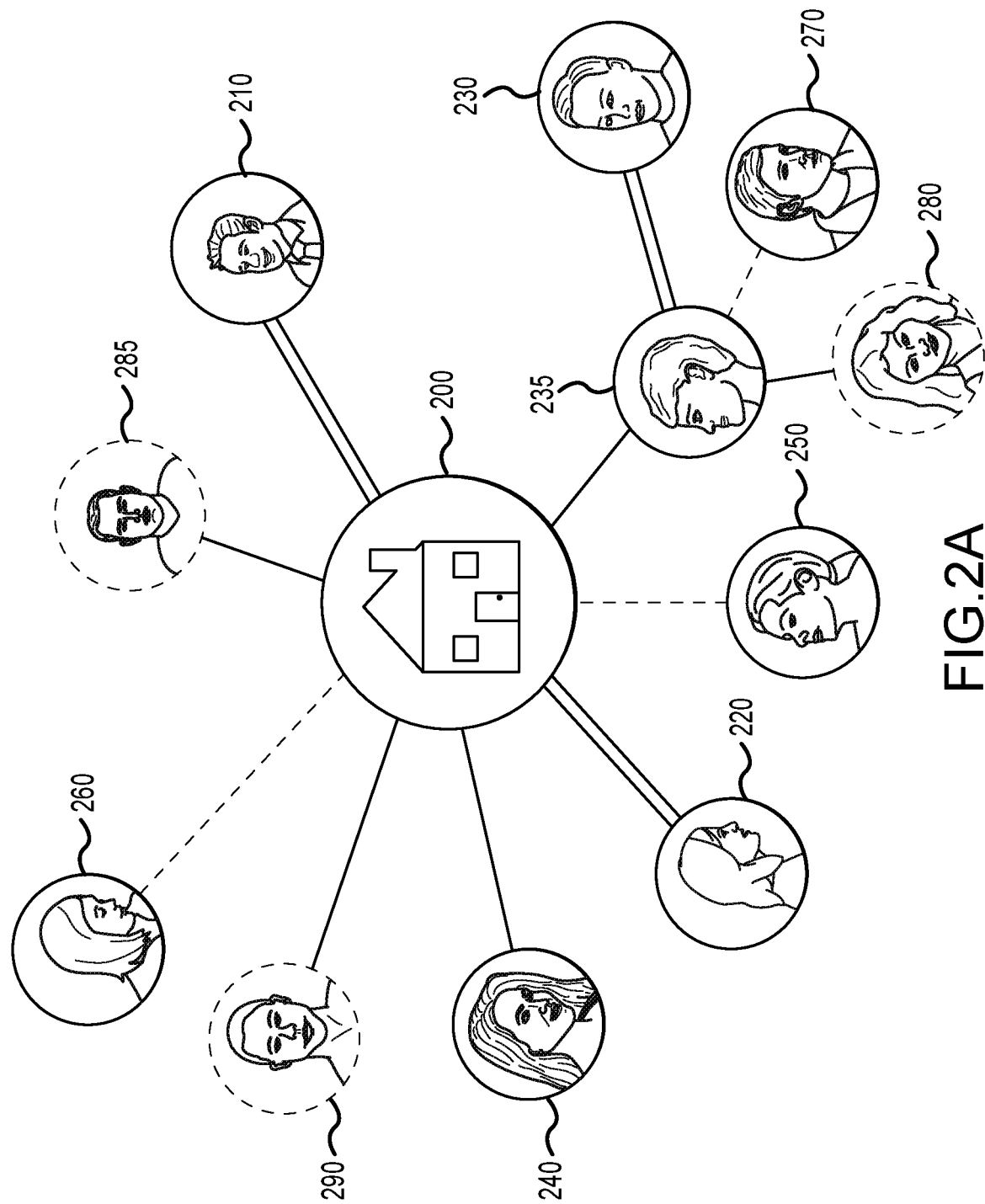

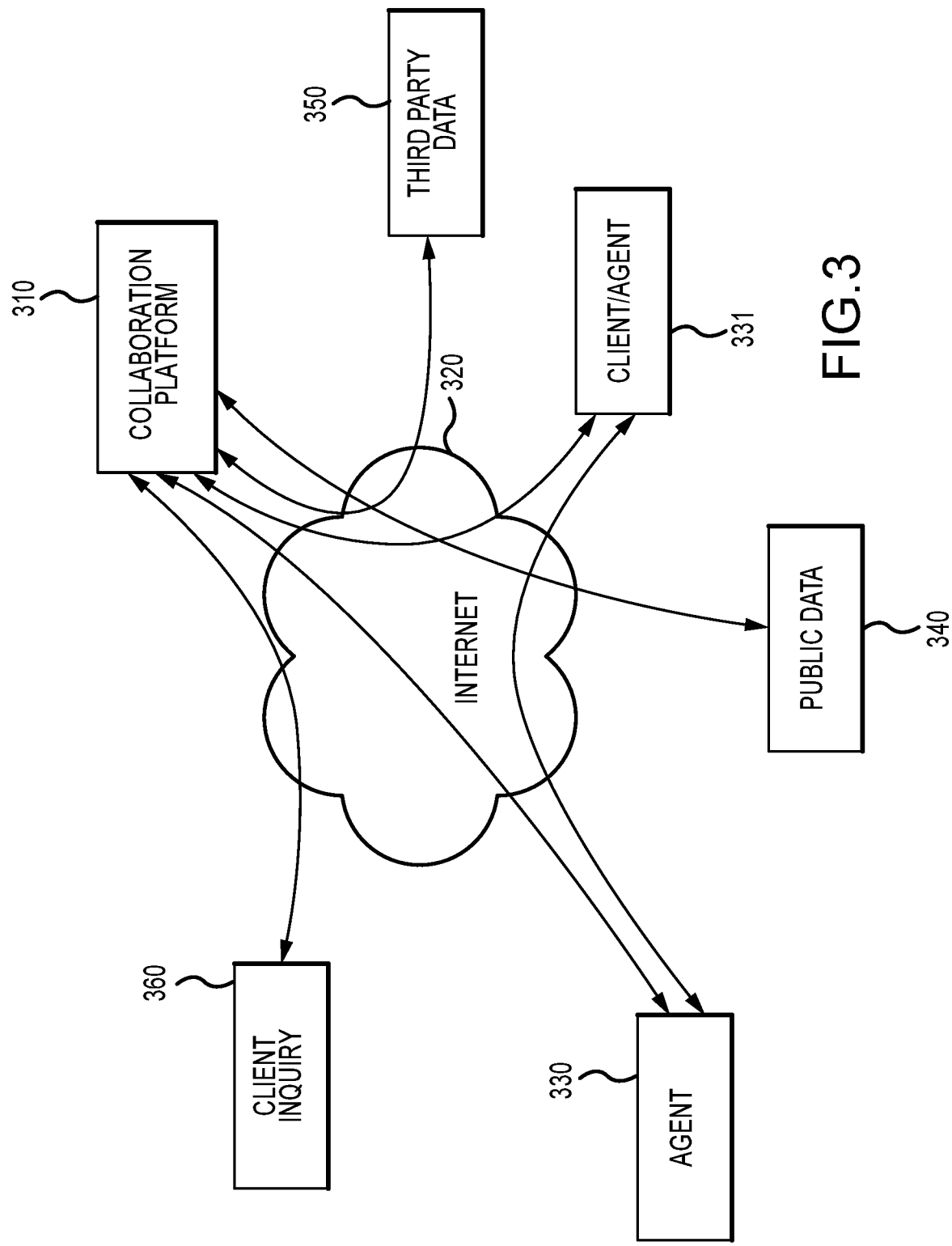

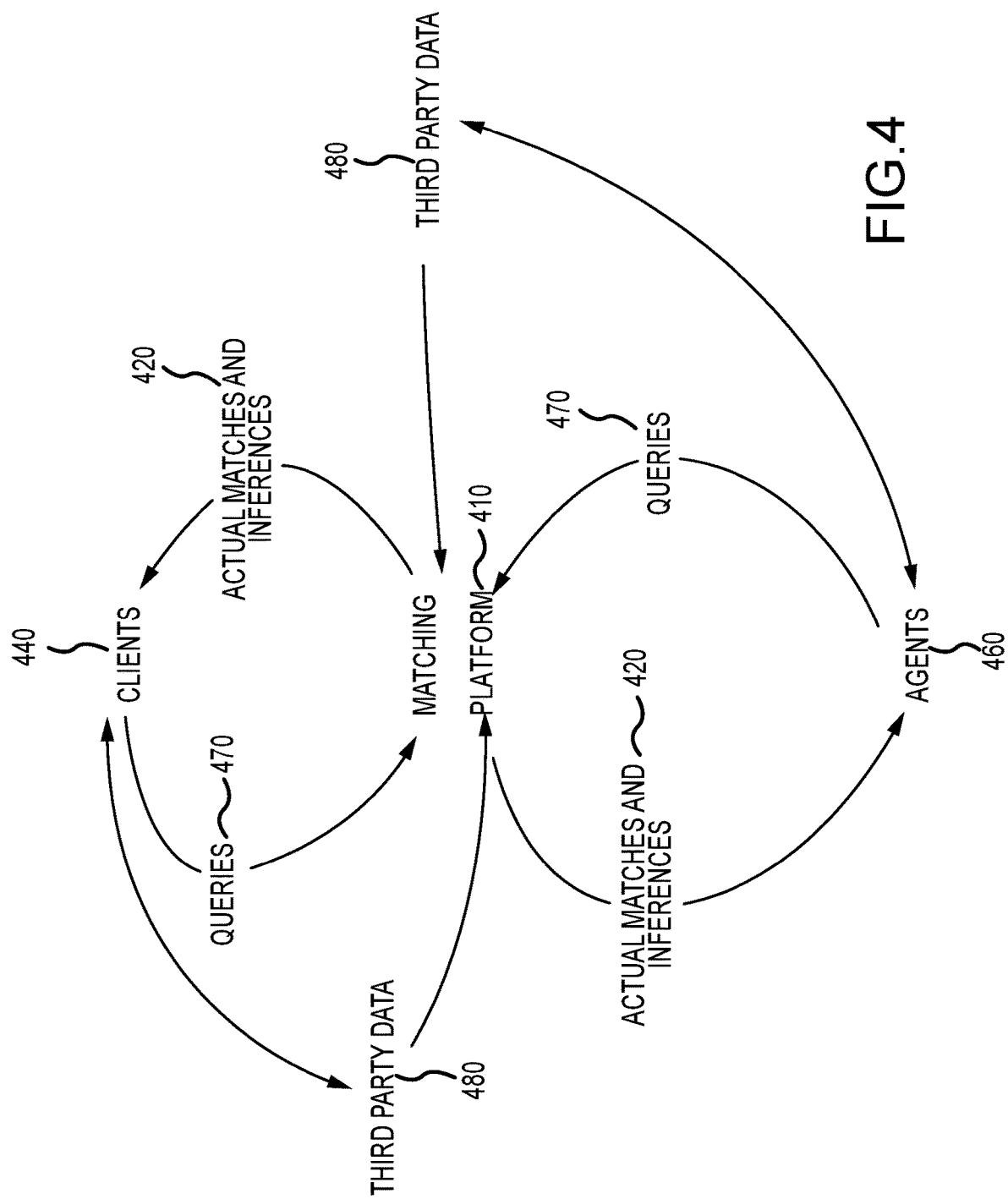

SYSTEM AND MACHINE IMPLEMENTED METHOD FOR ADAPTIVE COLLABORATIVE MATCHING

RELATED APPLICATION

The present application relates to and claims the benefit of priority to U.S. Provisional Patent Application Ser. No. 62/774,769 filed 3 Dec. 2018, and is a continuation in part of U.S. patent application Ser. No. 16/555,168 filed 29 Aug. 2019, both of which are hereby incorporated by reference in their entirety for all purposes as if fully set forth herein.

BACKGROUND OF THE INVENTION

Field of the Invention

Embodiments of the present invention relate, in general, to an adaptive collaborative data matching platform and more particularly to a system and associated methodology for adaptively matching normalized product data with purchaser affinities.

Relevant Background

Traditionally, high value assets or articles such as an estate, yacht, fine art or the like, are marketed locally among a discrete audience or through a specific "broadcast" network. An agent, brokerage, or firm having a local presence is engaged by one or more owners of the asset to facilitate a transaction. Information of a new property for sale, whether the property is real estate, art, jewelry, automobiles or the like, is published using local media, networks and any other means by which to advertise the attributes of the property to potential buyers. Typically, each asset owner individually engages a single firm to list their property and place it on the market. And while it is implied, or even explicitly stated, that the listing of the property for sale is shared to numerous other brokerages via publicly available information sources such as the Internet and other publications, the reality is that no true system of collaboration exists.

Concurrently, those interested in buying high value item contact agents, brokerages or firms to review any inventory of properties of which they may be aware, and to leverage their knowledge of the market with respect to particular types of properties that may be for sale. Those agents or firms with a network of information can bring forth more opportunities. In theory every firm is aware of every property offered by sale of all other firms in a market arena or in a network so as to provide each potential buyer with a comprehensive list of opportunities. Again, reality is far different.

Information with respect to available assets, their attributes and characteristics and data related to potential buyers is not universally shared. As a result, information, of both assets being sold and of potential buyers of such assets, is largely siloed and unstructured. Firms first attempt to sell a property or an asset known only to them to those potential buyers with whom they have a relationship. If a sale is not consummated internally, the agent may examine the market and network of colleagues, using her understanding of the client's preferences, to identify property that may be of interest to the client. In most cases the agent calls friends, colleagues and looks at publicly available information to identify property that they feel meet their client's interest, but the process is haphazard at best. No central repository of structured data exists from which the agent can draw or submit information as to the buyer, their lifestyle or preference. It is fundamentally up to the agent to attempt to understand their client's desires and match them with inventory of which they are aware.

Assets unknown to the agent remain undisclosed to the client. Moreover, the agent's ability to identify items that may be attractive to the client are constrained by the client's ability and willingness to convey such preferences and/or the agent's willingness and ability to discover them. Lastly, the market for the sale of high-value items remains largely a local market. Agents in San Francisco are unlikely to have an extensive and current knowledge of an offering in New York. Agents in New York are unaware of what may be available in Paris and a client in Beijing looking for something that may be available in Los Angeles would find little assistance from the local Beijing firm.

The compartmentalized nature of such high value asset markets and proprietary client information deters collaboration. Information with respect to items for sale and clients willing to purchase such assets, especially in the high-net worth arena, are not openly shared, nor is there any means by which to capture feedback to refine the search parameters and match a client seeking a particular type of property with an article that meets that client's demands.

A need therefore exists to provide a system and associated methodology to collect, normalize, and encrypt data and present that data in an adaptive collaborative environment accessible to a wide audience of qualified professionals or interested qualified parties. A need further exists to collect and refine client interests', attributes, data (structured and unstructured), and the like, and thereafter match those interests and attributes with elements of current and potential offerings. Lastly, a need exists for such a system to learn from user input and to refine its matching process so as to be adaptive. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A normalized, adaptive, collaborative matching platform containing information associated with a plurality of offerings is combined with information of the attributes of a plurality of potential buyers. The respective listings of articles for sale and potential buyers are iteratively examined, enhanced, normalized, and supplemented to identify potential matches based on attributes, common characteristics, and lifestyles. Each match is conveyed to respective agents associated with the buyer/article to foster further examination of a potential transaction.

In one version of the present invention a machine implemented method includes collecting, for a multiplicity of entities, data (both structure and unstructured) which is grouped according to a plurality of factors related to each entity. Using this information one or more tags are defined wherein each tag is a discrete grouping of the plurality of factors as well as a factor weight or score. These tags are thereafter selectively associated with each of the multiplicity of entities and assigned a weight and confidence so as to derive a lifestyle score. Each entity may have several lifestyle scores based on a scored relationship of various associated tags. The platform thereafter matches entities based on a correlation of these lifestyle scores.

Additional features of the methodology describe above can include normalizing the structured and unstructured data to match a predefined structured format criterion and appending the empirical data with third-party sourced and public data to make it more robust and complete. Appending the data can add ancillary information from these third-party sources and publicly available information as well as identify gaps in the data itself and data fields that can thereafter be rectified.

The method also allows an agent or client to customize data to enhance the association of tagging and ultimately matching and to thereafter adapt (refine) the tagging and matching process based on these inputs. During the matching process each factor describes a data characteristic or trait. These factors are grouped and weighed to form tags which describe a plurality of attributes based on empirical data. An agent's effort to refine the data is rewarded by producing more accurate matches known only to the agent and at the same time enables the platform to adapt and refine its normalization, derivation and matching processes so to be more accurate in future endeavors.

Tags, once formed and associated with an entity, are each assigned a confidence score as to the accuracy of each tag with respect to representation by that tag of factors of data related to that tag. Moreover, tags are given a weight as to their significance is assessing a lifestyle score. Agents can modify the factors associated with a tag of an entity thereby refining the factors and tags related to that entity and thus producing a refined lifestyle score.

The tags associated with each entity, their confidence score and their weight, provide the basis for determining a lifestyle score for a set of predetermined lifestyles. A correlation of these lifestyle scores between assets and individuals forms the basis for a list of matches.

In another embodiment, a non-transitory machine-readable storage medium can include machine executable code, which, when executed by at least one machine, causes the machine to collect and normalize structured and unstructured data for a multiplicity of entities regarding factors that enable the platform to associate the entity with one or more lifestyles. In doing so, the machine first defines one or more tags based on a plurality of factors and factor weights from the empirical data and then associates one or more of these tags with each of the entitles. Lifestyle scores are then derived based on a scored relationship of associated tags, tag weights, and tag confidence scores. Finally, entities are matched based on a correlation of lifestyle scores.

A system for adaptive collaborative matching is also presented comprising a processor communicatively coupled to a non-transitory storage medium. The storage medium includes instructions in machine executable form which, when executed by the processor, forms the adaptive collaborative matching platform of the present invention.

In one embodiment the adaptive collaborative matching platform includes a normalization engine communicatively coupled to a data store wherein the data store includes a database having a plurality of data fields of structured empirical data and unstructured data for a multiplicity of entities. The normalization engine converts the unstructured data to structured empirical data and modifies the structured empirical data to a predefined format. The plurality of data fields of structured empirical data is thereafter grouped according to a plurality of factors and each factor is given a weight or score based on the scope of data.

This version of the invention also includes a tag derivation engine communicatively coupled to the data store and the normalization engine wherein the tag derivation engine forms a plurality of tags. Each tag is a combination of related factors and each factor is assigned a factor weight. The tag derivation engine also assigns, for each entity, a tag confidence score for each tag, based on the combination of factors and factor weights.

A lifestyle engine is communicatively coupled to the data store, the normalization engine and the tag derivation engine. The lifestyle engine establishes an entity lifestyle score for each lifestyle of a predefined set of lifestyles for each entity. Each entity lifestyle score is based on a combination of tags and a weighted combination of the tag confidence scores.

Lastly a matching engine is communicatively coupled to the lifestyle engine wherein the matching engine bi-directionally correlates entities based on lifestyles, lifestyle scores, tags and tag scores. These matches are communicated to a user via a user interface through a correlation manager which is configured to present entity matches for which the entity lifestyle score for two or more entities exceeds a threshold The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned features and other features and objects of the present invention and the manner of attaining them will become more apparent, and the invention itself will be best understood, by reference to the following description of one or more embodiments taken in conjunction with the accompanying drawings, wherein:

FIG. 1 is high-level diagram illustrating a scope of unknown articles or assets for sale and buyers seeking certain articles, as compared to known, available articles and potential clients;

FIGS. 2A and 2B depicts differing perspectives of interest in a particular high-value article as compared to varied interest in high-value articles by a particular individual, in accordance with one embodiment of the present invention;

FIG. 3 shows, according to one embodiment of the present invention, a high-level network configuration and communication flow diagram;

FIG. 4 presents an abstract data flow diagram, according to one embodiment of the present invention;

Figure 2B:
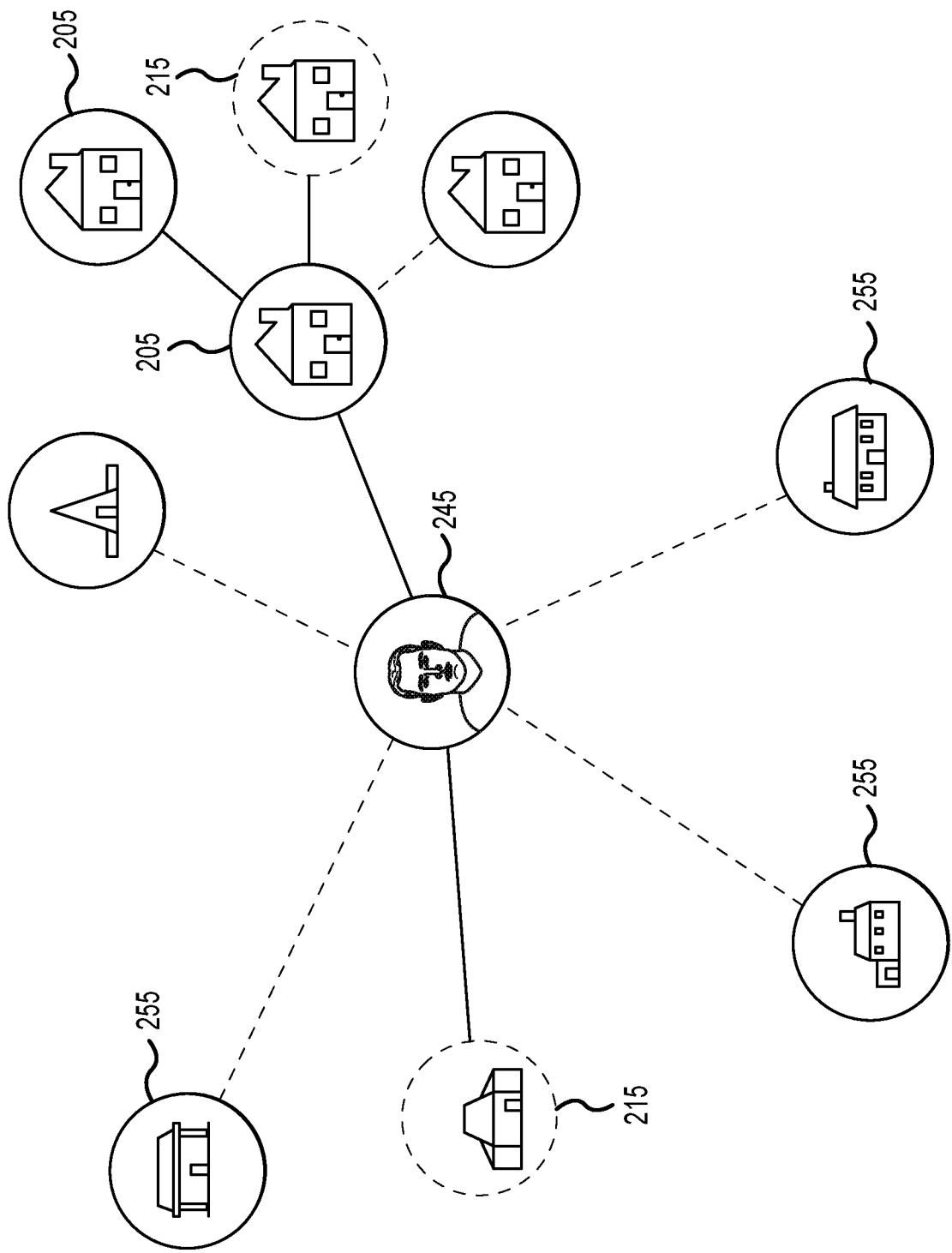

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

An adaptive collaborative platform applies various machine learning techniques to bi-directionally correlate potential purchasers with high-value articles or property that may be of interest. Attributes, characteristics, preferences, and the like of a potential purchaser are scored against attributes and features of articles. The platform of the present invention learns from interaction by agents with potential purchasers to become more attuned to the desires and lifestyle of purchasers and to gain more and more pertinent information from listing agents regarding high-value articles, so as to ultimately to arrive at a better match between a high value article for sale and a likely purchaser.

Data from a multiplicity of sources (structured and unstructured) is gathered, normalized and categorized to form, a lifestyle score for each entity. A matching process is thereafter undertaken to correlate a lifestyle preference of a potential purchaser with lifestyle attributes of high-value articles, and to correlate lifestyle attributes of high-value articles with those of potential purchasers.

FIG. 1 presents a graphical depiction of the compartmentalized nature of information and how the collaborative matching platform of the present invention pulls these relative silos of information together. In each local market there is a certain degree of understanding of high-value assets, articles or property that are known to be available for purchase, $P_a$ 110. Similarly, individuals (clients) who are actively looking to purchase certain types of articles make themselves known, $C_a$ 120. But in each market a vast number of articles, $P_b$ 130 exist, as does a vast number of potential purchasers, $C_b$ 140 that are unknown yet would be interested in a transaction of some sort if certain conditions are met. The current state of the art has little ability to identify and interact with these potential articles for sale or potential purchasers. As mentioned above, the markets and related information are siloed and non-collaborative. The present invention draws these groups together so that not only are numerous markets aware of active purchasers and assets known to be for sale but provides the ability to identify entities that are likely to become active when certain conditions are present.

Embodiments of the present invention are hereafter described in detail by way of example with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

For the purpose of the present invention the following understandings are applied.

Agent—An agent is an individual, broker, brokerage firm, or similar entity acting on the behalf of another person or entity. In the instant application an agent takes an active role to characterize a person's affinities, likes and dislikes with respect to a particular type of property or asset, as well as providing key information regarding certain articles that may be for sale that would be informative to certain individuals.

Client—A client is an individual or organization using the professional services of another. A client in this this instance may list their property with an agent having access to the collaborative matching platform of the present invention. Similarly, a client may engage an agent to identify articles of interest using the collaborative matching platform.

Asset, Article or Entity—An asset, entity or high-value article is an item which is or may be for purchase and is characterized by the collaborative matching platform of the present invention as fitting a particular lifestyle based on several attributes or tags.

Lifestyle—A lifestyle is a term used in the present invention as a measure of way of life or behavioral pattern. Various characteristics identify an entity's affinity or alignment with a certain lifestyle as does a person's likes, actions, purchases, and associations. Being an activist, a nature lover, or a socialite are examples of lifestyles.

Tag—A tag is a grouping of characteristics or factors used to describe an attribute of an entity. For example, an outdoor activity tag may include factors such as recent purchases of outdoor gear, passes at parks, participation in or membership in certain outdoor social groups or societies, etc.

Factor—A factor is a data characteristic or commonality by which to characterize structured data.

Structured data—Structured data are clearly defined making it easily searchable and resides within a fixed field of a record or file.

Unstructured data—Unstructured data are undefined and not easily searched such as audio files, video, social postings and the like. Unstructured data has internal structure but is not structured via pre-defined data models or schema. It may be textual or non-textual, and human- or machine-generated.

Unless otherwise defined above, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

The collaborative matching platform of the present invention breaks down barriers of the high-value asset sales model to offer a collaborative platform for the collection, sharing, enrichment, personalization and validation of information. Rather than simply scraping the Internet or other publicly available sources of information, the present invention invites disperse and dissimilar agents, brokerage houses, firms and the like to share information related to both articles for sale and potential buyers. As available information from each entity may differ and be provided in different formats, the present invention works to normalize and cleanse the information, examine the data for gaps, and thereafter query the provider to supply sufficient data so as to be universally collaborative. The invention also seeks additional information to augment that which has been provided to form a more accurate depiction of each entity.

The present invention spans multiple market dynamics including language, culture, interests, lifestyle, etc. to provide useful and actionable data. For example, the process for listing an estate for sale in Japan may include several features that are normally provided for the Japanese market, such as distance from the nearest mass transit station (which may be an important factor in determining in the Japanese market, but not other markets). Likewise, a property listed for sale in Germany may normally include several attributes that buyers in Germany value, such accessibility to the autobahn. Similarly, a buyer from New York may value how far a property is from the nearest airport or a green-space park or access to the harbor. Each of these local markets fail to consider and provide information that is relevant to buyers outside their local area.

One embodiment of the present invention collects, normalizes and aggregates data about articles for sale and individuals who may be interested in such articles to form accurate and universally useful information regarding each entity as it would apply to one or more lifestyles. Not only is collected data normalized as to language, units of measure, and the like, but it is also normalized as to its content changing unstructured data to a structured format. Once data is submitted to the collaborative matching platform it is analyzed for gaps against preexisting lists of attributes, traits and characteristics called factors. Queries are issued to the supplying agent and/or client for the collection of additional information. Gaps in the data are filled by third-party and public sources and finally derived data, information-based data that already exists, is added to or associated with each entity. Upon gaining a certain degree of data with respect to an entity, the information is published for wide dissemination. Data is grouped according various factors.

One feature of the invention is that the data and the means by which it is collected and normalized is continually refined and enriched based on feedback, observed behaviors and changing preferences. As requests for more information are gained on an article or property or individual, data fields are created, adjusted, and enriched, new data derived for existing information is added, and that data is appended with third-party data to ultimately arrive at a workable set of information. The collaborative database of the present invention gathers, normalizes, and aggregates observed data, derived data, appended data, enriched data, and, of course, original (agent provided) data. As part of the overall platform, tools facilitate the process of the data collection and validation. The invention recognizes that feedback can be used to refine the data collection and normalization process as well as other aspects of the collaborative matching platform.

Certainly, private details with respect to a potential purchaser are secured and remain confidential, but certain tastes, preferences, attributes, characteristics and affinities are input into the platform to create a profile. Information such as income bracket, sports likes and dislikes, political affiliations, career fields, family demographics, and the like are included and modified into a structured format to assist the invention understand what makes potential purchaser X tick and what sort of asset would be of interest to purchaser X. As part of the overall platform, tools facilitate the process of the data collection, normalization and validation.

The collaborative platform of the present invention then applies various machine learning techniques to extract structured information from unstructured data and identify common characteristics. These characteristics are attributed to tags which are used to assess a lifestyle. From this information, attributes, characteristics, preferences, etc. of one entity is scored against the attributes and features of another entity to arrive at a match.

For example, assume a potential purchaser has placed certain information relating to her preferences for a new property in the collaborative platform of the present invention. While only the agent she is working with knows her personal information, her profile on the platform is sufficient to identify several potential properties which appear to be a good match to her lifestyle. Looking at the matched properties the potential purchaser seeks additional information, for example, is there a park nearby or is the property bright and sunny. Inquiries are certainly made back to the listing agent or through public sources to respond to the inquiry, but the collaborative matching platform learns from this purchaser's question and notes that a nearby park is of interest to her as are properties that are bright and sunny. Her profile is updated to provide a better match. A property that was before dismissed as being a marginal match may now be viable since it is located in close proximity to a park with an open sunny floorplan, and other properties that may appear likely are supplemented by the system with information relating to the proximity of a park or have an open and bright floorplans. In that way the potential purchaser is gaining the information she needs to make a decision. But the present invention goes a step further. The invention described herein looks at these and other factors to assess a lifestyle with these preferences and to modify the process by which lifestyles in the future are assessed. Assume in this case that the reason the individual wanted to be close to a park and have a bright and sunny floorplan is that they are very athletic and run in the park often and routinely do yoga in the comfort of their home. This knowledge of a "lifestyle" will further refine the present search and future like searches.

The present invention iteratively updates and modifies its matching processes, criteria and the profiles on the data it retains in its database. This data is updated and modified both based on comments from a perspective entity but also based on input from third parties, such as agents.

The present invention reaches beyond active listings of articles for sale and active buyers. Certainly, properties that are currently for sale and buyers actively looking to purchase are included in the platform creating a bi-directional matching system.

The present invention recognizes that many transactions take place without any sort of active listing or search process. In many instances a friend of a friend knows of a of a property or an article that may be for sale if the price is right, or a friend knows a friend that may be interested in buying an investment property or article of interest is it meets their specific interests. These pocket listings or soft buyers are not represented in the current listings, but they are a vital portion of the present invention.

FIG. 2A is a graphic representation of the universe of potential purchasers for a high-value article. In this instance, the high-value article 200 is a house or an estate but as one of ordinary skill in the relevant art will appreciate the article may be a yacht, an aircraft, a piece of art, land or collectable item. Two individuals 210, 220 have identified themselves to a listing agent 240 as being interested in an article of this type 200 and a third individual 230 has conveyed his interest through a mutual friend 235. Other individuals 250, 260, 270 would be interested but for the fact they not aware the asset is for sale. And yet others 280, 285, 290 are aware that the property 200 is available but lack a full understanding of its attributes and may become interested if certain features are present. The collaborative matching platform of the present invention goes beyond linking assets for sale with known purchasers, but rather identifies individuals who are likely to be interested in the property had they only been informed it was available.

Likewise, and as shown in FIG. 2B, the present invention identifies not only properties that are currently known to be for sale 205 by an agent 245, but ones 215, although not currently for sale, in which the owner has indicated he or she may be open to selling the property if the price was right. The invention also identifies property for sale 225 unknown to the agent, but which may be desirable to a certain class of buyer. Experienced agents are well aware that these types of transactions happen frequently, but they only occur through extremely protected relationships that are rarely communicated outside of a local office. The present invention is therefore bi-directional in that it identifies or matches buyers to assets rather than simply identifying assets that align to a buyer's interests.

The present invention identifies such matches and signals agents possessing these relationships with information of a potential match while still protecting that coveted relationship. The collaborative matching platform provides information necessary to facilitate a further confidential conversation between agents and clients. In many instances the sale may not occur but without the collaborative platform of the present invention, the purchaser would not be aware that a coveted property in a distant location may be obtained, nor may an owner realize that a purchaser may indeed exist and be willing to pay that "right price" had they only known such an asset existed.

The present invention uses a personality (lifestyle)-based algorithm that correlates the attributes and features of one entity with the likes, dislikes, attributes and features associated with another entity, whether or not one entity is an asset actively listed as being available for sale, or whether or not another entity is a client actively looking for an asset. The present invention provides an agent intelligence and more personalized ways to engage with property owners and/or the buyers of properties.

FIG. 3 is a data flow diagram of the transfer of information between the collaborative matching platform of the present invention and various entities and the adaptive nature of the platform itself. As depicted, the adaptive collaborative platform 310 is communicatively coupled to a wide area network 320 such as the public Internet. Through the Internet the collaborative matching platform, in one embodiment, gains data with respect to client inquiries 360 from clients interested in purchasing assets and assets that are available for purchase. For example, an agent 330 may provide the platform information regarding a piece of fine art identifying the artist, the mood, color palette, mindset of the artist if known, history, and other things that may be of interest to an art collector. Similarly, agents may identify a customer or client, anonymously or not, as someone looking for a certain type of sailing vessel, the type of sailing that person likes to do, crew size, ports of call, etc., and that this client is also a collector of fine art. The platform gains information related to these entities from public data 340 and third-party data 350 to supplement entries and build a profile.

Using a person's interested in purchasing a sailing vessel as an example, the collaborative matching platform may inquire and gain from public information that this individual is avid in sailing circles, has owned several vessels but has traded them up every 2-5 years for a larger ship and that each ship has housed fine art. The system may also gain a historical list of ports of call based on harbor master records and find that he typically cruises the Caribbean and Mediterranean Seas and appears to have a taste for certain fine art related to nautical themes.

Client/agent 331 is an agent that operates on behalf of a client (potential buyer) who typically operates only through an agent. The interactions of agent 330 and client/agent 331 with the collaboration platform are similar.

The present invention aligns the interests and preferences of a potential purchaser with the attributes and characteristics of a listing. With further reference to FIG. 4, as more listings are reviewed and feedback is given and inferences 420 gained, the present invention refines 370 the matching process and issues inquires to gain more information on properties, or the purchaser, to return better results. The collaborative matching platform 410 may identify several vessels that are currently for sale but also identify a few that meet the client's interests and needs but are not officially listed as being on the market. These may not be a typical match but one that reflects on both the client's 440 interest in sailing and art. For example, a classic sloop of which a version is depicted in a famous painting. Feedback and queries 470 from the client and/or agent 460 can provide inferences as to what qualities or features of the list of first matches are more or less important to the client, thereby refining the process. Similarly, agents 460 can provide additional information 480, refining yet still the process.

FIG. 4 is illustrative of the adaptive nature of the collaborative matching process. A successful transaction tied to a match between entities provides feedback that the process correctly identified a correlation. However, only one transaction can occur while there may be several successful correlations. The invention recognizes that the use of natural language processing and other semantic techniques may not accurately normalize unstructured data to a structured empirical format, nor may the association of factors with certain tags and their weights be accurate. Lastly the combination of tags and their confidence scores forming a lifestyle score may requires adjustment. Feedback from users, agents, clients, transactions and the like, are feed back into the matching platform by which the processes are modified (adapted) to arrive at a more refined and accurate matching process.

The adaptive collaborative matching platform creates a matching model for each correlation implementation. The processes, factors, factor weights, tag derivations, instructions and the like are stored as a first model. Upon recognizing feedback such as a user feedback score and/or user input to refine the matching process a new, second matching model is formed having modified the processes of the normalization, tag derivation and lifestyle engines. Again, user feedback scores are collected and compared to prior models. Trends are extracted and recognized. If subsequent models produce higher feedback scores showing improved correlations and adoptions of the matches, the adaptive collaborative matching platform autonomously adopts new instructions reflective of the improved processes. The process is iterative and ongoing enabling the adaptive collaborative matching platform to continually improve and learn from prior matches and additional data collection.

For example, assume a tag in the matching platform is defined as proximity to nature and such a tag includes 3 factors including distance to municipal parks, distance to open space, distance to national parks. The platform may initially assign an equal weight to each of these factors. Upon receiving a list of matches an agent or similar user may examine the allocation of factors to the proximity to nature tag and include information related to "green space" and assign a higher weight to municipal parks than to national parks. The present invention recognizes and tracks such modifications (model 1 vs. model 2) and upon seeing trends modifies the processes by which the matching platform operates. In this case, after several independent submittals of feedback relating to the proximity to nature tag, the invention may add a fourth factor and/or vary the factor weights. Again, this modification, refinement, process is iterative and continuous and applies to all aspects of the collaborative matching platform.

Turning back to the earlier purchaser who asked if a property is near a park, the adaptive collaborative matching platform of the present invention cannot only reevaluate other properties with known proximity to parks and present those as possible matches, but it also can send queries to the listing agent of similar properties to gain information with respect to how far are their properties from the nearest park, athletic facilities, yoga studios and the like, that meet the purchaser's lifestyle. Those that come back with favorable data can be again evaluated based on the new information.

To accomplish these, and other, goals, the collaborative matching platform of the present invention forms tags related to certain common attributes, characteristics or features (called factors) of the properties, and, of the potential purchasers (entities). Not all factors are equal. In some instances, a certain factor may have a more driving effect on a tag. And one factor may be used or associated with several tags but have a different impact on each tag. The collaborative matching platform thereafter associates combinations of these tags, along with a tag confidence score, with an entity to arrive at a particular lifestyle score. The lifestyle is scored based on characteristics of their personalities, their behaviors, and the like reflected in combined tags with a measure of confidence that the tags accurately reflect the characteristics of that entity.

Each entity may be associated with several tags and each tag may reflect several factors such as privacy, social activities, entertaining, and the like. The factors are weighed and used to craft a score according to their reliability and validity. A verified public record reflecting that a property is adjacent to an open space may provide high certainty in this feature's contribution to the outdoor activity tag. Accordingly, that sort of structured data may result in a high factor weight as to an open space factor weight. A subjective unstructured review of the property that simply states, "this property is close to open space" may receive a lower confidence rating, even after the unstructured data is resolved to a structured format. For example, "close" may be normalized to less than 0.5 miles but greater than 0.25 miles. A tag is associated with various factors and their weights which results in a degree of confidence that the tag represents a certain attribute. Tags are further associated with lifestyles which are based on a combination of tags and a confidence rating. Thus, a score of 75 for an outdoor activities tag is qualified as to a degree of confidence, which is considered by the lifestyle engine when assessing a lifestyle score, such as, nature lover lifestyle.

Figure 5:
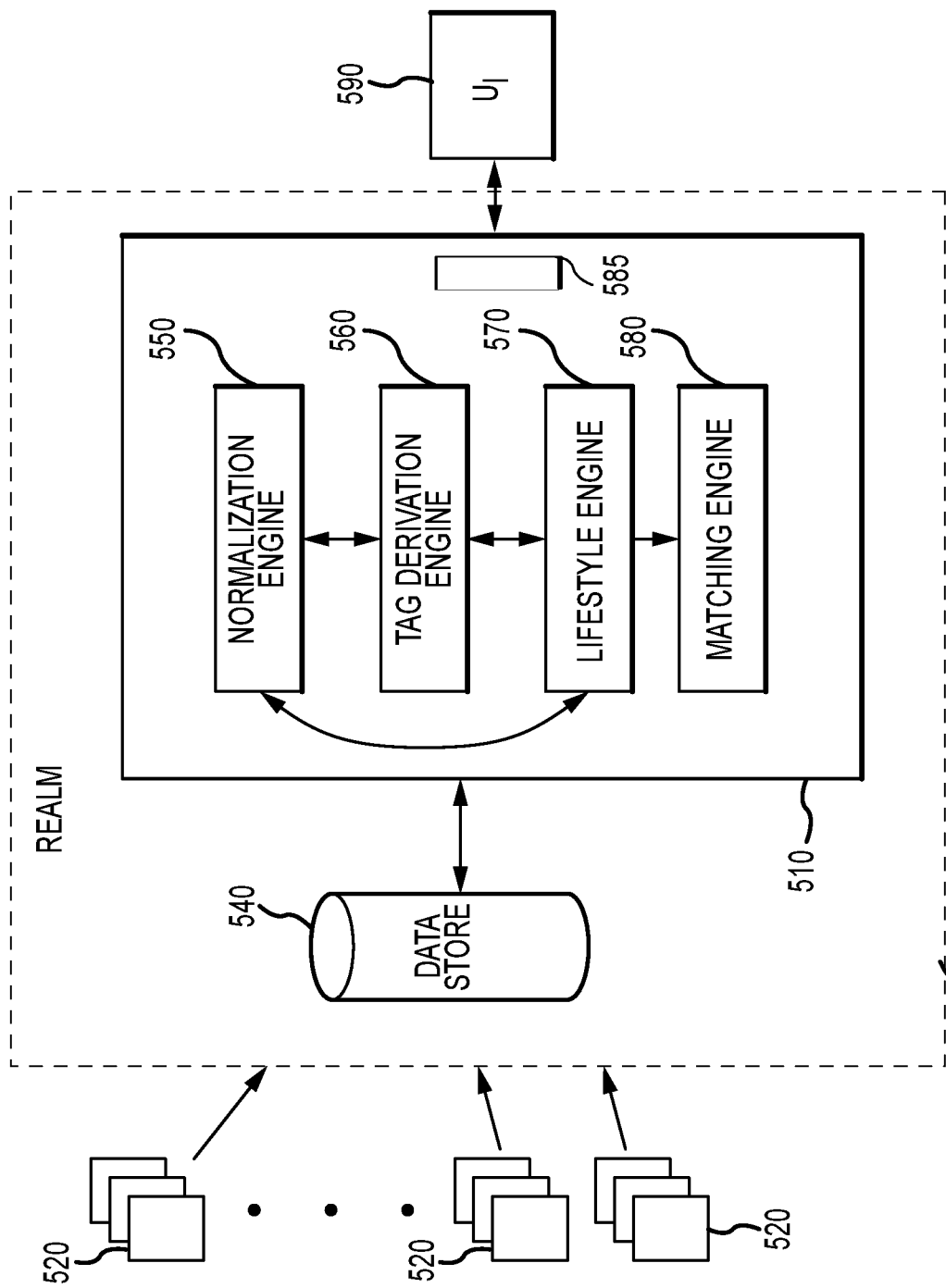
FIG. 5 is a high-level depiction of a platform for adaptive collaborative matching, according to one embodiment of the present invention.

FIG. 5 is a high-level system architecture for one embodiment of the collaborative matching platform of the present invention. The collaborative matching platform 510 is communicatively coupled to a plurality of data sources 520, clients, agents and third parties which provide structured and unstructured data to the platform. As discussed, the platform of the present invention is envisioned as residing on a separate server and offered as a service. However, having the platform resident on a client location or distributed using a server cluster as a means to implement the platform are within the scope of the present invention.

In the instance shown in FIG. 5, the collaborative matching platform 510 resides on a server 530 having a non-transitory storage medium on which instructions, in the form of machine executable code, exist. These instructions, when executed by the processors on the server, form an instantiation of the collaborative matching platform 510 of the present invention. The collaborative matching platform 510, as depicted, is communicatively coupled to a data store 540. The data store 540 may be resident on the server or within a local area network or securely coupled to the platform using secure communication techniques such as tunneling or encapsulation. These techniques are well known to one of reasonable skill in the relevant art.

The collaborative matching platform 510 includes, in this embodiment, a normalization engine 550, a tag derivation engine 560, a lifestyle engine 570 and a matching engine 580. As shown the normalization engine 550, the tag derivation engine 560 and lifestyle engine 570 are in communication with each other to arrive at the most accurate assessment of an entity's lifestyle. The lifestyle engine 570 is thereafter communicatively coupled to the matching engine 580 which ultimately aligns the lifestyle scores of entities. Upon identification of a match or series of matches the output is conveyed to a suitable user interface 590 for consideration. Users may thereafter provide feedback and revise data associate with factors, factor association and weights as associated with tags, and the combination of tags as considered when crafting scores for one or more lifestyles.

At a high level, data is collected and normalized or cleansed using the normalization engine. Structured empirical data is input into a database and into data fields. Unstructured data is analyzed using natural language processing and semantic analysis to arrive at some form of structured data. Gaps in the data are recognized and rectified either with direct inquiry to the supplier of the data or through third-party data sources. For example, assume that a gap exists in an asset's description such as a property's distance from a park or fitness facility. Parks and fitness facility locations are widely available from public sources and can be directly queried by the collaborative matching platform to determine such information and used to supplement the existing asset profile. Access to a mapping software or website may be able to ascertain that a property is exactly 0.4 miles from the nearest fitness facility. In another instance a news article may state that the property is very close to a fitness facility. This unstructured data may be interpreted as meaning the property is no more than 0.5 miles away but greater than 0.2 miles. Now structured, the data nonetheless has a lower degree of confidence that the prior structured example.

Data fields within the data store's database can also be derived. For example, historical and public information may determine that a likely purchaser has previously owned and currently owns a home that is both close to a golf course and a beach. Moreover, the owner is an avid deep-sea fisherman based on public purchases of equipment, posts regarding travel, competitions, and the like. That individual's (entity's) profile is modified by the platform to include data fields and accompanying data to reflect an affinity for homes having close access to a deep-water port, boating and golf, even though those specific issues were not supplied by the individual.

The information can also be enriched from agent and client input as can the process by which the data is evaluated. In such an instance a new duplicate but enriched profile is created leading to more precise results. The tags associated with this new profile are updated and the resulting output of the matching engine directed to the agent who supplied the additional information. Importantly, the new input is used to refine the normalization, tag derivation and lifestyle scoring process.

As discussed, the normalization engine of the present invention modifies the format of data (structured and unstructured) received from various sources to align with a common, predetermined format protocol. The normalization engine also looks at various data fields for a particular entity and identifies and attempts to resolve gaps in data. Data collection is typically done at a local level. Cultural norms and experience in a local market drive the agents and similar personnel to gather information appropriate for that local market. However, local data fields may not accurately address the needed information to complete a lifestyle analysis of the present invention. Accordingly, the present invention goes beyond simple translation of provided data by analyzing the data fields or lack thereof. In instances in which the data provided is missing certain fields of information the platform will seek the information from the providing source, third-party sources and public sources to create a robust database of information for each entity.

Normalization of data can be illustrated by the following example. Assume an individual in San Francisco casually tells a broker that they may be in the market to buy a ski house in the Rockies. They express some likes and dislikes but offer no definitive timeline or geographic restrictions. The information is input into the present invention which normalizes (structures) the data and attempts to fill in gaps such as size, price range, income level, attributes of former or current homes, club affinities, purchases of sporting equipment or other data that may provide insight as to the potential purchasers state of mind. Certain aspects of the individual can be ascertained as structured empirical data such as age, reported income, marital status, etc. Likewise, a friend of a friend tells a broker in Colorado that an individual in Aspen may be interested in selling a second home if the right opportunity was presented. Some details are listed and in this case the two appear to line up, but each data profile is incomplete. The respective agents are notified and inquires for additional data sent.

In high net-worth markets certain attributes can modify the normal means by which specific assets are valued and thereafter modify the way a class of assets are valued. Certain buyers' value different aspects of a property differently when they make a purchase. One may value privacy more so than the number of rooms. High value asset valuation does not follow normal valuation models but is rather more akin to the way a person lives or the lifestyle opportunities a property may present. The present invention captures criteria of value to one entity and imputes those to prospective entities possessing those characteristics. Just as beauty is in the eye of the beholder, an asset's value, in certain markets, is strongly influenced by the affinities of the purchaser.

The present invention, in another embodiment, integrates local economic trends and normalizes them. The invention incorporates trends from relevant markets (such as art and auto auctions), to value a property more as a piece of art rather than just a traditional piece property, and applies statistical techniques that are appropriate for building an algorithm for a segment of homes where the data set is smaller and sparse.

Figure 6A:
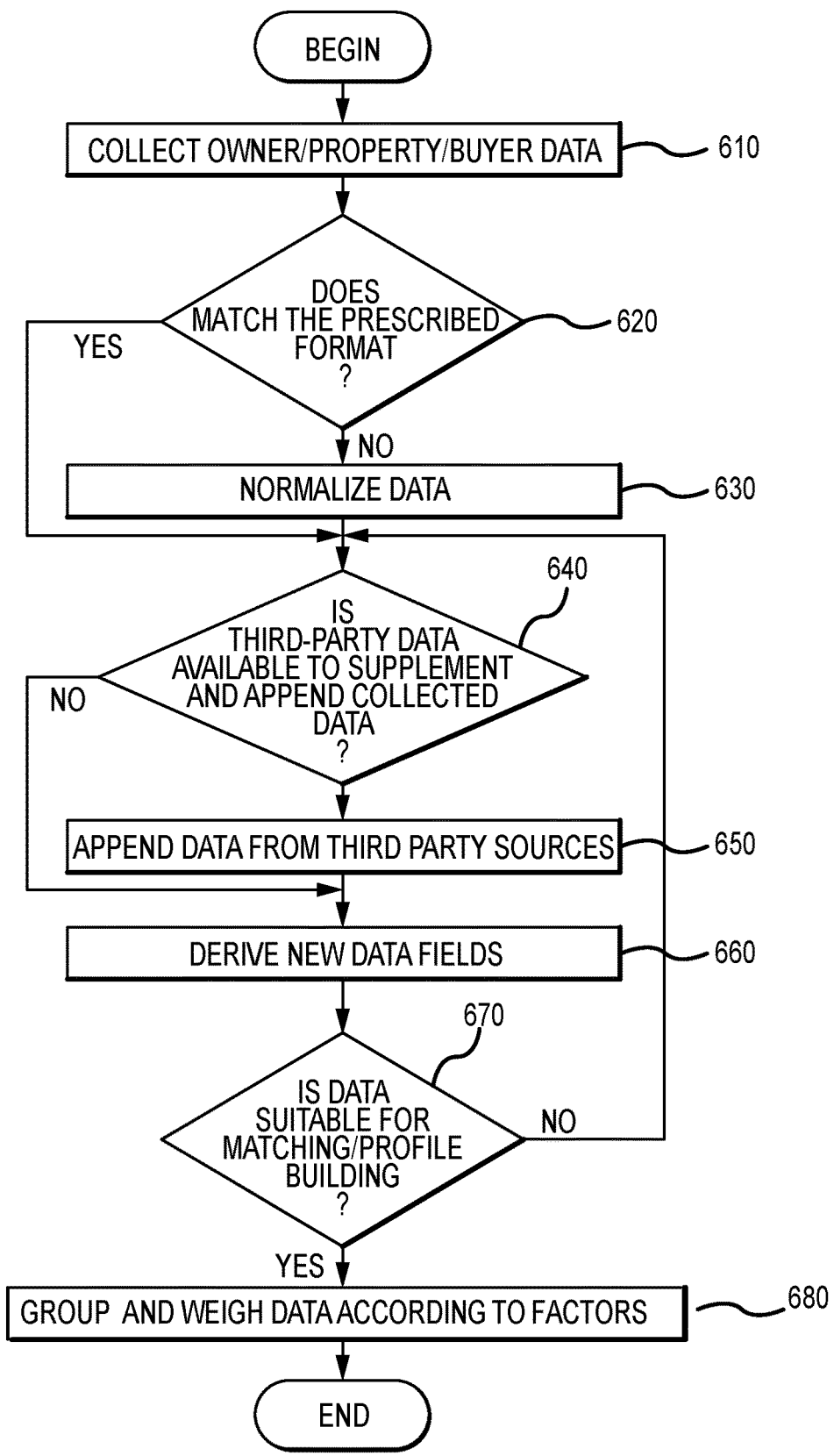
FIG. 6A is a flowchart of a process, according to one embodiment of the present invention, by which to collect and prepare data suitable for use by an adaptive platform for collaborative matching.

With additional reference to FIG. 6A, a process by which to collect and normalize data for the collaborative matching platform of the present invention is shown. Data with respect to an owner, property or a buyer (entity) is collected 610 and normalized 630 to be structured and in the same format and protocol if found 620 to be aberrant. Gaps in the data are recognized 640 and third-party sources are tapped to append 650 the provided data. Using this information, the data is enriched by expanding the number of fields 660 with respect to certain attributes and to ultimately derive new data. As new data fields and gaps are recognized the process repeats 670, looking again for public or third-party data to create a better representation of the entity. The data is grouped and weighed according to a plurality of factors 680 and ultimately passed to the tag derivation engine.

Figure 6B:
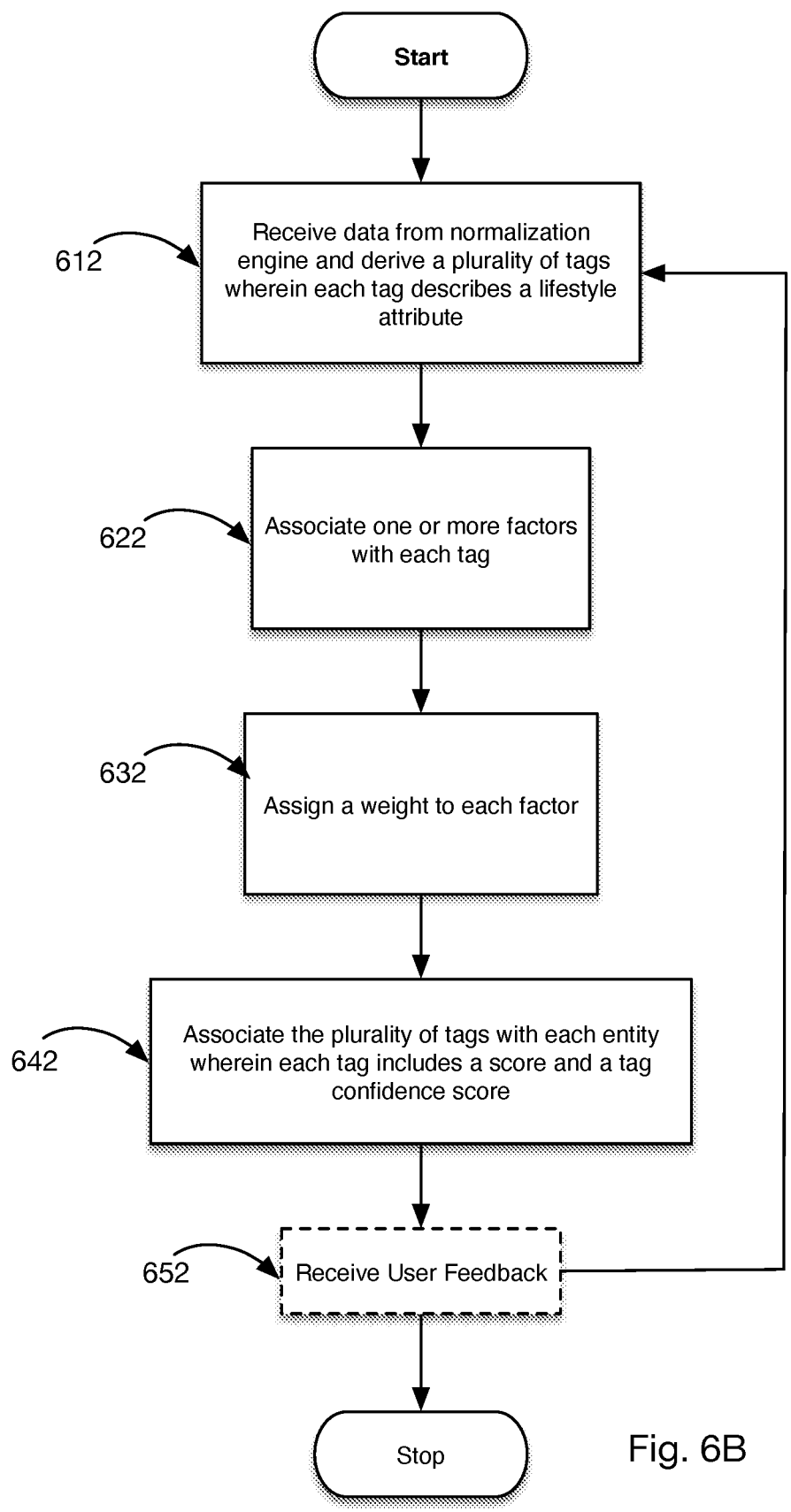
FIG. 6B is a flowchart of a process, according to one embodiment of the present invention, by which associated and weigh factors defining one or more tags for use by a platform for adaptive collaborative matching.

With reference to FIG. 6B, the tag derivation engine 560 receives data from the normalization engine 550 and derives 612 a plurality of tags, each describing a lifestyle attribute. The derivation engine groups or associates 622 collected data according to factors relating to each entity. Factors that represent evidence, common traits, characteristics of a particular interest or activity are placed in discrete groups. Factors are based on groupings of data. For example, the number of purchases of outdoor gear in the last 6 months may be one factor. Another factor may be the number of subscriptions to an outdoor focused periodical. A "likes the outdoors" tag may be based on factors such as the number of purchases of outdoor gear in the last 6 months, the number of outdoor focused subscriptions, and the number of visits to national parks in the last 5 years. The type and amount of data results in its grouping into a factor and results in a factor weight 632. Each entity may or may not be associated with a particular tag and two or more entities may be associated with the same tag. The tag however is scored (weighted) differently for each entity 632. For example, two entities may be associated with the "likes the outdoors" tag but one entity may have data that reflects several visits to national parks while the other may have very few visits to national parks but is an avid reader of outdoor periodicals.

Once a tag is derived, the tag receives a score indicating the ability of this particular tag in capturing these types of characteristics for an entity and is associated 642 with that entity. In this case the first entity may have a high "likes the outdoors" tag confidence based on highly weighting the number of visits to national parks. The second entity may receive a lower tag confidence rating since despite being an avid subscriber to outdoor focused periodicals, the entity has had limited contact with national parks. The tag combinations and their confidence ratings are applied to a score before it is passed to the lifestyle engine. As users review the data, tag derivation and their weights, feedback is received, and a user may modify 652 particular sets of data, factors, and weights. These modifications are feed back into the tag derivation process so that subsequent derivations can be more accurate and refined.

Returning to the prior example of a home that may be offered for sale in the Rockies. The collaborative matching platform has gained information not only on the specifics of the home such as size, cost, tax base, etc., but also features such as access to open space, hiking trails, distance to ski slopes, light profiles inside the house, distance from neighbors, distance to schools, distance to the local market, social opportunities, etc. These factors are grouped and weighed. One tag in this example may represent outdoor activities. Factors such as proximity to hiking trails, ski slopes, and open space contribute to that tag's score. Another tag may relate access to amenities and services. The distance to markets, the number of nearby shops, number of bars nearby may be factors in the amenities and services tag.

Based on collected and normalized data for an entity, the outdoor activity tag may be scored at 75 while the amenities and services tag at 25. For another entity the same tags may be scored 35 and 50, respectively. In the first instance, the close proximity to hiking trails, ski slopes and open space speaks strongly that this entity is aligned with outdoor activities yet may also be associated with an individual who is self-sufficient and not reliant on service providers. Thus, a measure confidence is assigned to indicate the strength of these values.

The tagging process of the present invention is rule driven using natural language processing and the like to craft tags based on search parameters. Tagging requires cohesive and consistent structured data. In one version of the present invention, tags are extracted from information pertinent to drive characterizing both properties and potential purchasers. As the present invention gathers more information about each property and the preferences of the purchasers it can refine the matching algorithm and provide a curated presentation of opportunities. One purchasers' affinity for location or layout to support an entertaining lifestyle may drive which properties are presented, and how they are presented while a similar purchaser having different interests would experience a completely different presentation, tuned to their needs.

The lifestyle engine of the collaborative matching platform examines the combination of tags, their scores, and the confidence of each score and aligns each with one or more predetermined lifestyles. A lifestyle is a behavior, attitude, core value system, world view, what provides pleasure or satisfaction, or simply a way of life or what makes a person tick. Lifestyle may include views on politics, religion, health, intimacy, and more. Individuals may possess several different aspects of their lifestyle and certainly the present invention recognizes that a person on one day may be embracing one side of their personality and do something completely different the day after. The present invention crafts a measure of a particular lifestyles of both the asset and individual.

Lifestyles of the present invention may include athletic, nature lover, socialite, entertainer, leisure, adventurist, business or corporate, creative, artistic, activist, technician and the like. Certain tags align with certain types of lifestyles. For example, a high scoring outdoor activity tag would may be aligned with a nature lover and athletic but not as applicable to an entertainer or socialite. But a nature lover may or may not be athletic and an individual with an athletic lifestyle may or may not like nature. Accordingly, the tags provide inputs to the lifestyle engine to assess a particular entity's lifestyle. For each of the predetermined lifestyles, the entity receives a value or score. If the lifestyle score exceeds a predefined threshold, the lifestyle and its score is associated with the entity.

Turning back to our individual who has expressed interest in owning a home in the mountains, the factors and data collected with respect to that individual have found that they possess a high score outdoor activity tag with high confidence, and perhaps a high score on privacy, albeit with lower confidence. Based on these and other tags the individual may be associated with nature lover score of X and an athletic score of Y. They would also be assessed a score for the other lifestyles such as business or corporate, creative, activist and the like.

Each entity is associated with each tag and each lifestyle of a set of lifestyles is assessed for each entity. As each entity has unique scores on each tag due to the data collected and the factor weights, each lifestyle score is different. One entity who has high scores for an urban socialite may have low scores for nature lover.

The matching engine of the collaborative matching platform identifies correlations between lifestyle scores by employing machine learning and related neural algorithmic processes in the data normalization, tag derivation and lifestyle matching processes. In one embodiment algorithms embody artificial intelligence and neural networks to model data using graphical techniques. Symbolic logic, rules engines, expert systems and knowledge graphs are used in concert with machine learning to capture otherwise unrealized identifiers in the data. The present invention modifies itself when exposed to more data. It is dynamic and does not require human intervention to make certain changes. Elements of the weighted approach include a quality indicia (Qi) which is the presence of a given characteristic associated with the client or the asset. It also includes weight indicia (wi)—this is a weight assigned to a given quality in the creation of a matching profile based on characteristics impact or importance; and lastly a confidence level (ci) which is a rating of confidence in the assignment of the quality to a given person or property.

The essence of the present invention is that an individual is more likely to be interested in and purchase an asset that is aligned with their lifestyle. The system characterizes an asset as being aligned with certain lifestyles and then seeks individuals who share those behavioral orientations, vice versa, the invention identifies the behavioral orientation of an individual and finds assets that are so aligned.

These processes described herein overlap and occur concurrently, iteratively and in real time and are designed to be internally adaptive. The invention recognizes feedback as how to improve and autonomously revises the algorithmic process to improve accuracy. As more information is entered and gathered the process becomes more precise and more successful in its ability to match properties with a purchaser's affinities.

Figure 7:
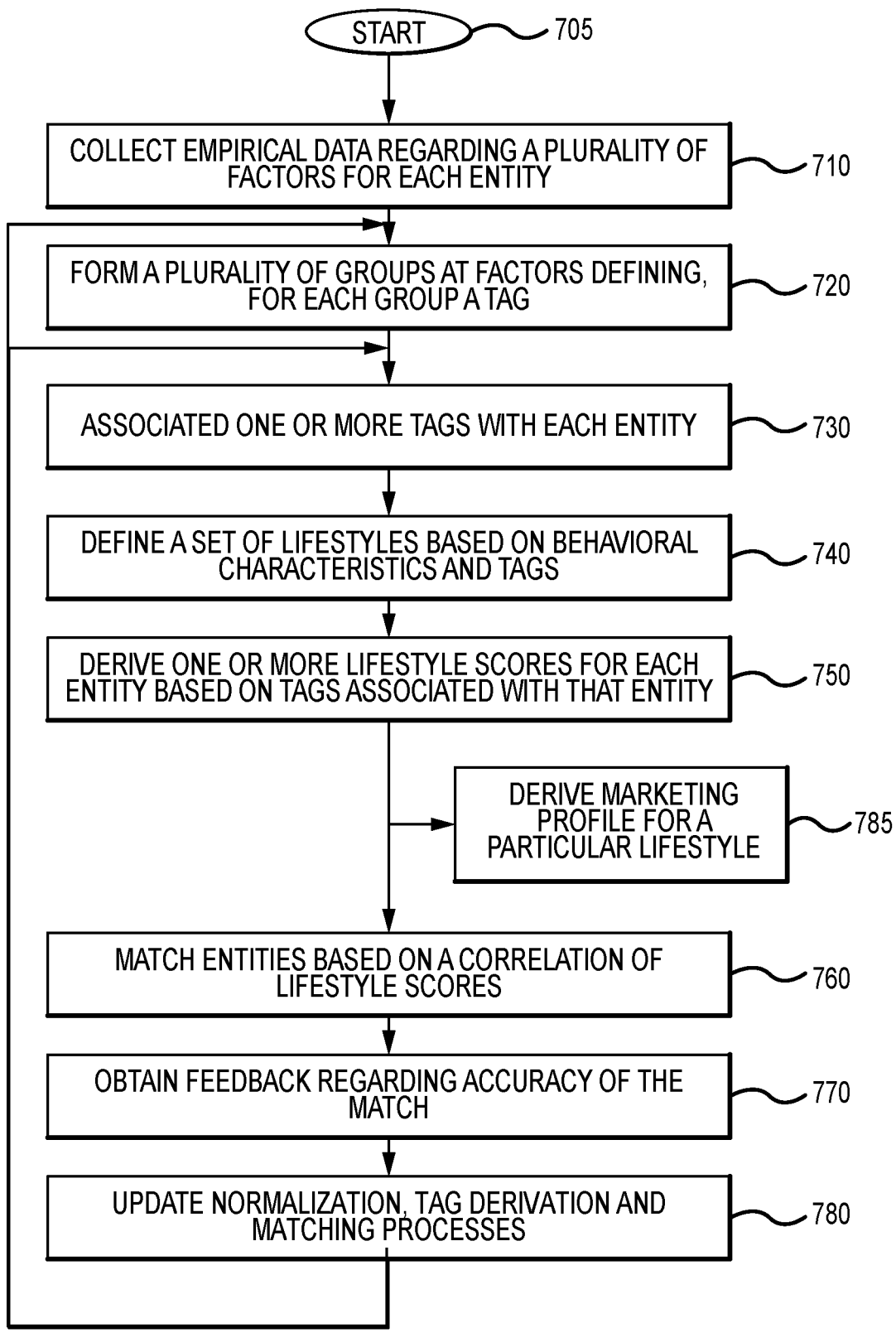
FIG. 7 is an expanded flowchart of one methodology, according to the present invention, for collaborative matching of high-value articles for sale with potential buyers.
Figure 8:
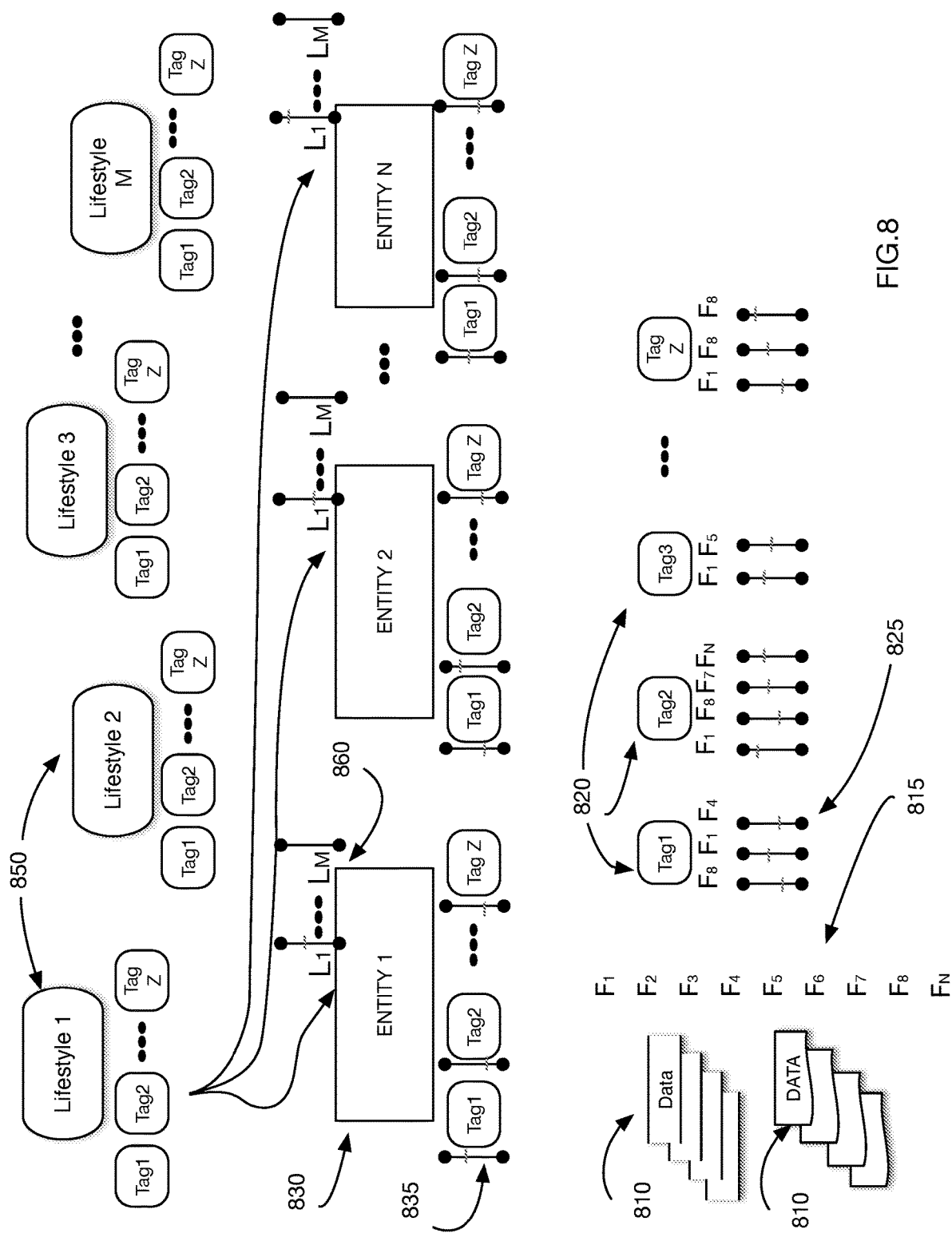
FIG. 8 is a high-level depiction of the architecture for an adaptive platform for collaborative matching according to one embodiment of the present invention.

FIG. 7, which provides a flowchart of a methodology for adaptive collaborative matching according to one embodiment of the present invention, can be better understood when viewed in combination with FIG. 8. FIG. 8 is a high-level architecture of the adaptative collaborative matching process of the present invention. The process begins 705 with the collection 710 and normalization of data 810 for each entity 830. In doing so a multiplicity of inquiries are made to determine if the correct fields are included for the data and to gain information to supplement the original data entries. The data is categorized (grouped) according to factors which are thereafter assigned a weight based on depth of that data related to that factor and how it relates to a tag.

From the data gained, factors 815 are grouped 720 forming tags 820 representative of certain lifestyle attributes. Each factor is assessed a weight 825. Data with respect to factors such as travel purchases, club memberships, and the like may find associations into a certain type of likes to travel tag which is associated 730 with each entity. For example, a tag for "outdoor activities" may heavily rely on and weigh a factor for outdoor subscriptions. A "leisure travel" tag may also consider the outdoor subscription tag but not weigh it as high as a factor for airline ticket purchases. Likewise, the tag for "outdoor" activities may not even consider the airline ticket purchase factor. The factors are weighed 825 and the data is assessed to craft a tag score 835 as well as a tag degree of confidence for each entity 830. That is, how confident, based on the data for that entity, is the tag representative of a particular attribute. The same tag for one entity may have a very high degree of confidence, while for another entity the data behind the tag does not convey as much confidence.

From the tags associated with each entity, the lifestyle engine 570 defines 740 and assesses 750 a lifestyle score 860 for each lifestyle 850 based on combinations of tags, tag scores and confidence ratings of those tag scores. Each entity 830 may possess a number of different lifestyle scores 860 to arrive at a unique overall impression of that persons or assets behavioral characteristics. For example, a person may be an activist who loves nature and is athletic. Another may be a socialite who loves to entertain but appears to be very involved in activist groups for ecology, conservation and nature. Similarly, assets may possess traits or characterizes that are aligned with such lifestyles. A home in the mountains may be more aligned with a nature lover than a social activist, yet a suburban condominium with close access to know public venues may fit of the activist who likes to entertain. Conversely, a home in the mountains in an activist or liberal leaning community may be more attractive than the same property in a conservative right leaning region.

Each lifestyle is scored for each entity and provided with a measure as to how confident the platform is with its assessment. Using a weighting rule-based approach the lifestyles of the entities are correlated to identify matches 760 between entities. Feedback is obtained 770, new data is sought, collected, normalized, derived and applied 780. Tags are re-associated, their evaluations reassessed, and lifestyles are once again measured and valued. The iterative process of the collaborative matching platform enables clients and agents alike to develop a precise marketing profile 785 for a particular asset so as to look for individuals who possess the lifestyle that would find the asset interesting or aligned with their interests. It also enables the platform to refine its processes so that the next set of matches are more accurate and applicable.

A significant feature of the present invention is agent engagement. The front end of the platform is a dashboard through which the agent can interact. It is a system by which an agent can identify new leads, leads beyond those that exist in their current brokerage. The leads can be ranked or scored based on the degree of matching (correlation) to present to the agent a measure of what avenue to pursue first. Matches are listed but also ranked. Recall that currently a brokerage within one community would not know of what is on the market and associated with another brokerage, despite the fact that such information would directly meet a purchaser's needs. Information is currently broadcasted but not correlated. The invention provides personalized recommendations between agents so that agent A listing a property in city B, can become aware of a purchaser that exists in city C represented by agent D, and vice versa.

The platform also promotes and rewards agents for refining information related to an entity. As matches are reviewed, the platform will seek additional publicly available or third-party provided information. An agent working with a client or an asset can proactively seek and gain such information to make the matching process more accurate. The information can be refined, information added or deleted based on the agent's knowledge of the client. The present invention isolates the agent's efforts to a new data file so that only that agent can see the refined matches. Accordingly, an agent willing to expend time and effort to assist in data collection and tag assessment is rewarded with more accurate and on point matches.

Another feature of the present invention is privacy and security. One aspect of the platform resides on top of existing data that already exist and resides at various agents and brokers. For example, in the real estate market, current brokerage houses possess a database of properties and client profiles. Clearly such information is proprietary, and collaboration of the data raises concern of loss of such information.

The present invention shares behavioral information, attributes, and characteristics of both properties and potential buyers without providing data that would undermine individual brokerage operations or breaching their confidential information. The present invention enables agents to trust the platform and create a unique database reaching beyond geographic boundaries that drives engagement rather than compartmentalization.

Included in the description are flowcharts depicting examples of the methodology for collaborative matching as described above. In this description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 9:
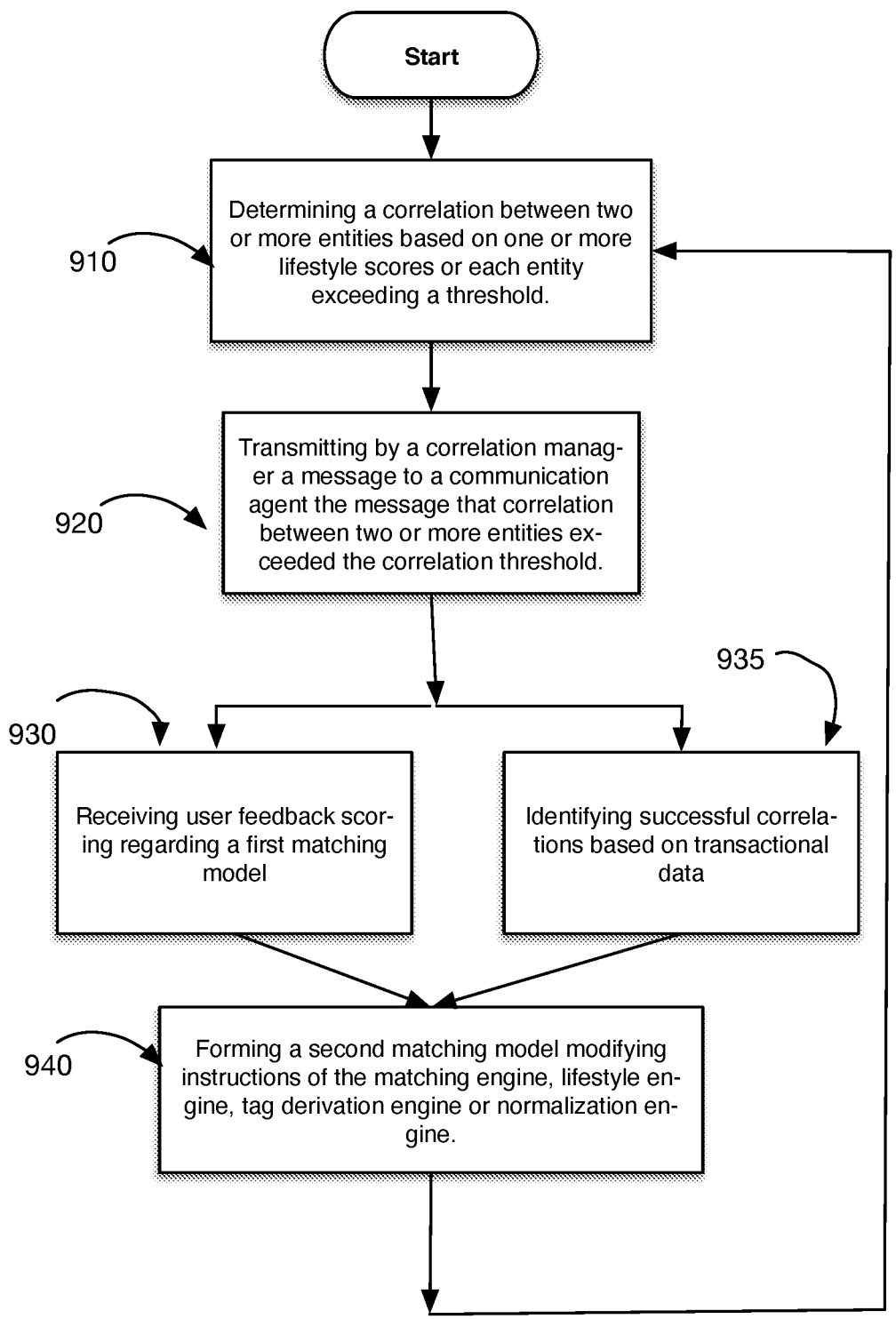
FIG. 9 is a flowchart for communication among correlated entities matched the adaptive collaborative matching platform of the present invention.

FIG. 9 is a flowchart for communication among correlated entities matched the adaptive collaborative matching platform of the present invention. Upon determining 910 that a correlation exists between two or more entities based on one or more lifestyle scores exceeding a predefined threshold, the correlation manager 585 crafts 920 an electronic message or the like to communication agents informing them that two or more entities have matched. Recall that the lifestyle score is calculated from a set of tags, tag scores, and tag confidence scores for each entity and each tag is based on structured data grouped by factors, each factor being assigned a factor weight forming a first matching model.

The communication agent and the correlation manager 585 operated in conjunction with the user interface 590 to gain user feedback scoring 930 regarding the current matching model. Based on the feedback and the feedback scores, a second model is formed 940 and implemented by the adaptive collaborative matching platform. If matches improve validated by feedback or transactional data, modifications are implemented making the second model, the primary or first model. Upon doing so the data is reassessed and new correlations 910 are identified.

The invention also tracks successful correlations based on transactional data 935. As matches occur and are communicated to users one or more transactions may take place validating that the match indeed was successful. Similarly, offers may also indicate successful correlations and matches. This information, or lack thereof, is used to "score" the matching model and thereafter modify the instructions to create better matches in the future.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent, non-transitory, storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

While there have been described above the principles of the present invention in conjunction with a collaborative matching platform, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for adaptive entity matching, comprising:
a processor communicatively coupled to a non-transitory storage medium having instructions in machine executable form which, when executed by the processor, forms an adaptive collaborative platform, the platform including
a normalization engine communicatively coupled to a data store wherein the data store includes a database having a plurality of data fields of structured empirical data and wherein the normalization engine modifies unstructured data into the structured empirical data using natural language processing and thereafter groups the plurality of data fields of the structured empirical data according to a plurality of factors, each factor being basis for a discrete grouping of the structured empirical data;
a tag derivation engine communicatively coupled to the data store and the normalization engine wherein the tag derivation engine forms a plurality of tags, each tag being a combination of the plurality of factors and wherein each factor of the plurality of factors is assigned a factor weight, and wherein the tag derivation engine assigns, for each entity, a tag score and a tag confidence score for each tag, based on a combination of the structured empirical data, the plurality of factors and the factor weights of each of the plurality of factors,
a lifestyle engine communicatively coupled to the data store, the normalization engine and the tag derivation engine, wherein the lifestyle engine establishes, for an entity, an entity lifestyle score for each lifestyle of a predefined set of lifestyles and wherein each of the entity lifestyle scores is based on a combination of the plurality of tags, a weighted combination of the assigned tag scores, and the assigned tag confidence scores, and
a matching engine communicatively coupled to the lifestyle engine wherein the matching engine iteratively correlates the entities based on lifestyles, the entity lifestyle scores, the plurality of tags and the assigned tag scores forming a first matching model; and
a user interface communicatively coupled to the processor configured to send a user message listing entity correlations based on the first matching model, and to receive a user feedback score for the entity correlations and wherein based on the user feedback score the matching engine, the lifestyle engine, the tag derivation engine and the normalization engine modify instructions and form a second matching model.

2. The system for adaptive entity matching according to claim 1, wherein responsive to a user feedback score of the second matching model exceeding the user feedback score of the first matching model, the adaptive collaborative platform autonomously adopts instructions associated with the second matching model.

3. The system for adaptive entity matching according to claim 1, wherein responsive to user feedback scoring of the first matching model, the adaptive collaborative platform alters the factor weights of each of the plurality of factors and the assigned tag scores in forming the second matching model.

4. The system for adaptive entity matching according to claim 1, whereby the second matching model includes a modified plurality of factors and a modified lifestyle score for each of the lifestyles for each of the entities based on the user feedback.

5. The system for adaptive entity matching according to claim 1, wherein the adaptive collaborative platform autonomously modifies the assignment of the factor weight to each of the plurality of tags based on recognized subsequent user modifications.

6. The system for adaptive entity matching according to claim 1, wherein each of the first matching model and the second matching model is a correlation implementation and wherein the adaptive collaborative platform collects, stores and compares the user feedback score for each of the first matching model and the second matching model and identifies trends for improved correlations and match adoptions.

7. The system for adaptive entity matching according to claim 6, wherein responsive to identifying trends for improved correlations and match adoptions, autonomously adopting new instructions reflective of improved correlation implementations.

8. The system for adaptive entity matching according to claim 1, wherein the normalization engine, the tag derivation engine and the matching engine employ machine learning and neural algorithmic processes.

9. A machine implemented method for entity correlation communication, comprising:
    modifying, by a normalization engine, unstructured data retrieved from a data store having a plurality of data fields into structured empirical data using natural language processing;
    forming a plurality of tags, by a tag derivation engine, each tag being a combination of a plurality of factors and wherein each factor of the plurality of factors is assigned a factor weight and a tag score;
    establishing, by a lifestyle engine, an entity lifestyle score for each lifestyle of a predefined set of lifestyles and wherein each of the entity lifestyle scores is based on a combination of the plurality of tags and the assigned tag scores;
    determining, by a matching engine, a correlation between two or more entities when one or more of the lifestyle scores of each of the two or more entities exceed a correlation threshold, wherein each of the one or more lifestyle scores is calculated from a set of tags, the assigned tag scores, and tag confidence scores for each of the two or more entities and wherein each tag of the plurality of tags is based on the structured empirical data grouped by the plurality of factors, each factor of the plurality of factors being assigned a factor weight forming a first matching model;
    transmitting, by a correlation manager, an electronic message to one or more communication agents, wherein each entity of the two or more entities is associated with at least one communication agent, the electronic message signaling that correlation between the two or more entities exceeded the correlation threshold based on the first matching model;
    receiving, through a user interface, from the one or more communication agents, user feedback scoring of the first matching model; and
    forming a second matching model based on the user feedback scoring and thereafter modifying one or more of the matching engine, the lifestyle engine, the tag derivation engine or the normalization engine.

10. The machine implemented method according to claim 9, further comprising grouping the structured empirical data according to the plurality of factors.

11. The machine implemented method according to claim 9, wherein the forming the plurality of tags includes assigning a tag confidence score for each tag based on a combination of the structured empirical data, the plurality of factors and the factor weights of each of the plurality of factors.

12. The machine implemented method according to claim 11, wherein the entity lifestyle score includes a weighted combination of the assigned tag scores and the assigned tag confidence scores.

13. The machine implemented method according to claim 9, wherein responsive to receiving user feedback scoring of the second matching model exceeding the user feedback scoring of the first matching model, adopting, by the matching engine; modifications associated with the second matching model.

14. The machine implemented method according to claim 9, further comprising modifying, by a user through the user interface, one or more factors associated with a tag of an entity thereby forming the third matching model with a refined plurality of factors related to that entity and a refined lifestyle score.

15. The machine implemented method according to claim 9, wherein each of the first matching model and the second matching model represents a correlation implementation and further comprising collecting, storing and comparing the user feedback score for each of the first matching model and the second matching model and thereafter identifying trends for improved correlations and match adoptions.

16. The machine implemented method according to claim 15, wherein responsive to identifying trends for improved correlations and match adoptions, autonomously adopting new instructions reflective of improved correlation implementations.

17. The machine implemented method according to claim 9, wherein determining the correlation employs machine learning and neural algorithmic processes.

* * * * *